(12) United States Patent
Haletky

(10) Patent No.: US 12,067,123 B2
(45) Date of Patent: Aug. 20, 2024

(54) RELAY-SWITCH WITH SANDBOX COMMUNICATION CONNECTIONS

(71) Applicant: Bank of America Corporation, Charlotte, NC (US)

(72) Inventor: Edward L. Haletky, Austin, TX (US)

(73) Assignee: Bank of America Corporation, Charlotte, NC (US)

( * ) Notice: Subject to any disclaimer, the term of this patent is extended or adjusted under 35 U.S.C. 154(b) by 402 days.

(21) Appl. No.: 17/402,853

(22) Filed: Aug. 16, 2021

(65) Prior Publication Data

US 2023/0047932 A1 Feb. 16, 2023

(51) Int. Cl.
*G06F 21/57* (2013.01)
*G06F 21/53* (2013.01)
*H04W 12/37* (2021.01)

(52) U.S. Cl.
CPC ............ *G06F 21/577* (2013.01); *G06F 21/53* (2013.01); *H04W 12/37* (2021.01)

(58) Field of Classification Search
None
See application file for complete search history.

(56) References Cited

U.S. PATENT DOCUMENTS

| | | | |
|---|---|---|---|
| 8,782,604 B2 | 7/2014 | Konduri et al. | |
| 9,294,488 B2 | 3/2016 | Vasseur et al. | |
| 9,680,845 B2 | 6/2017 | Langton et al. | |
| 10,069,837 B2 | 9/2018 | Turgeman et al. | |
| 10,354,074 B2 | 7/2019 | Gupta | |
| 10,387,627 B2 | 8/2019 | Johnson et al. | |
| 10,419,464 B2 | 9/2019 | Sandke et al. | |
| 10,614,213 B1* | 4/2020 | Demsey | G06F 21/552 |
| 11,232,193 B1* | 1/2022 | Raber | G06F 9/54 |
| 2008/0016339 A1* | 1/2008 | Shukla | G06F 21/54 713/164 |
| 2018/0253551 A1* | 9/2018 | Chalmandrier-Perna | G06F 21/554 |
| 2019/0005227 A1* | 1/2019 | Weinstein | G06F 9/46 |
| 2019/0007257 A1* | 1/2019 | Weinstein | H04L 63/0209 |
| 2022/0114257 A1* | 4/2022 | McKerchar | G06F 9/45558 |

* cited by examiner

*Primary Examiner* — Adolf Dsouza
(74) *Attorney, Agent, or Firm* — Banner & Witcoff, Ltd.

(57) ABSTRACT

A network connection device may include at least one sandbox to detect, isolate, and remove any discovered malware or cyber threat. The device may be configured to receive, save, and inspect data. A control layer may manage network connectivity so that only home organization network connections or external party network connections are connected at given moment in time.

20 Claims, 7 Drawing Sheets

RELAY-SWITCH WITH SANDBOX COMMUNICATION CONNECTIONS

BACKGROUND

Aspects of the disclosure relate to electrical computers, systems, and devices for connecting internal organizations networks to numerous external networks for communication of information while protecting the internal networks from malware and external threats.

Organizations to conduct business must connect to outside networks to transmit and receive large amounts of information. Some organizations in various different industries are required by laws or regulations to connect to various external networks that may be prone to numerous attacks or threats. For instance, the financial industry must connect to numerous Nation/States networked systems in order to conduct international trade and commerce. Some of these systems may be under constant attack from bad actors attempting to comprise connected systems with malware or other threats.

Today many organizations in numerous industries are almost always connected to certain external networks to transact business. Firewalls are not enough as some protocols are allowed to freely go back and forth through various ports. There is a need to develop a system and method which assists organizations that need to connect to certain external networks having known bad actors safely while protecting their internal networks from malware and other cyber threats.

SUMMARY

In light of the foregoing background, the following presents a simplified summary of the present disclosure in order to provide a basic understanding of various aspects of the disclosure. The summary is not limiting with respect to the exemplary aspects of the disclosure described herein and is not an extensive overview of the disclosure. It is not intended to identify key or critical elements of or steps in the disclosure or to delineate the scope of the disclosure. Instead, as would be understood by a person of ordinary skill in the art, the following summary merely presents some concepts of the disclosure in simplified form as a prelude to the more detailed description provided below. Moreover, sufficient written descriptions of the embodiments of this application are disclosed in the specification throughout this application along with exemplary, non-exhaustive, and non-limiting manners and processes of making and using the inventions, in such full, clear, and concise, and exact terms in order to enable skilled artisans to make and use the inventions without undue experimentation and sets forth the best mode contemplated by the inventor for carrying out the inventions.

Aspects of this disclosure address one or more shortcomings in the industry by implementing a method and system to deny bad actors an opportunity to attack organizations by using a system having a relay-switch device with sandbox communication connections. In accordance with one or more embodiments, the relay-switch device only enables one-sided connections at a time, either home organization network connections or external party network connections. In a further embodiment, the two sides do not directly communicate with other.

In accordance with one or more embodiments, the relay-switch device includes at least one sandbox to detect, isolate, and remove any discovered malware or cyber threat. In an embodiment, data is received, saved, and inspected in the at least one sandbox of the relay-switch device. A control layer manages network connectivity so that only home organization network connections or external party network connections are connected at a given moment in time.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting.

Figure 1A:
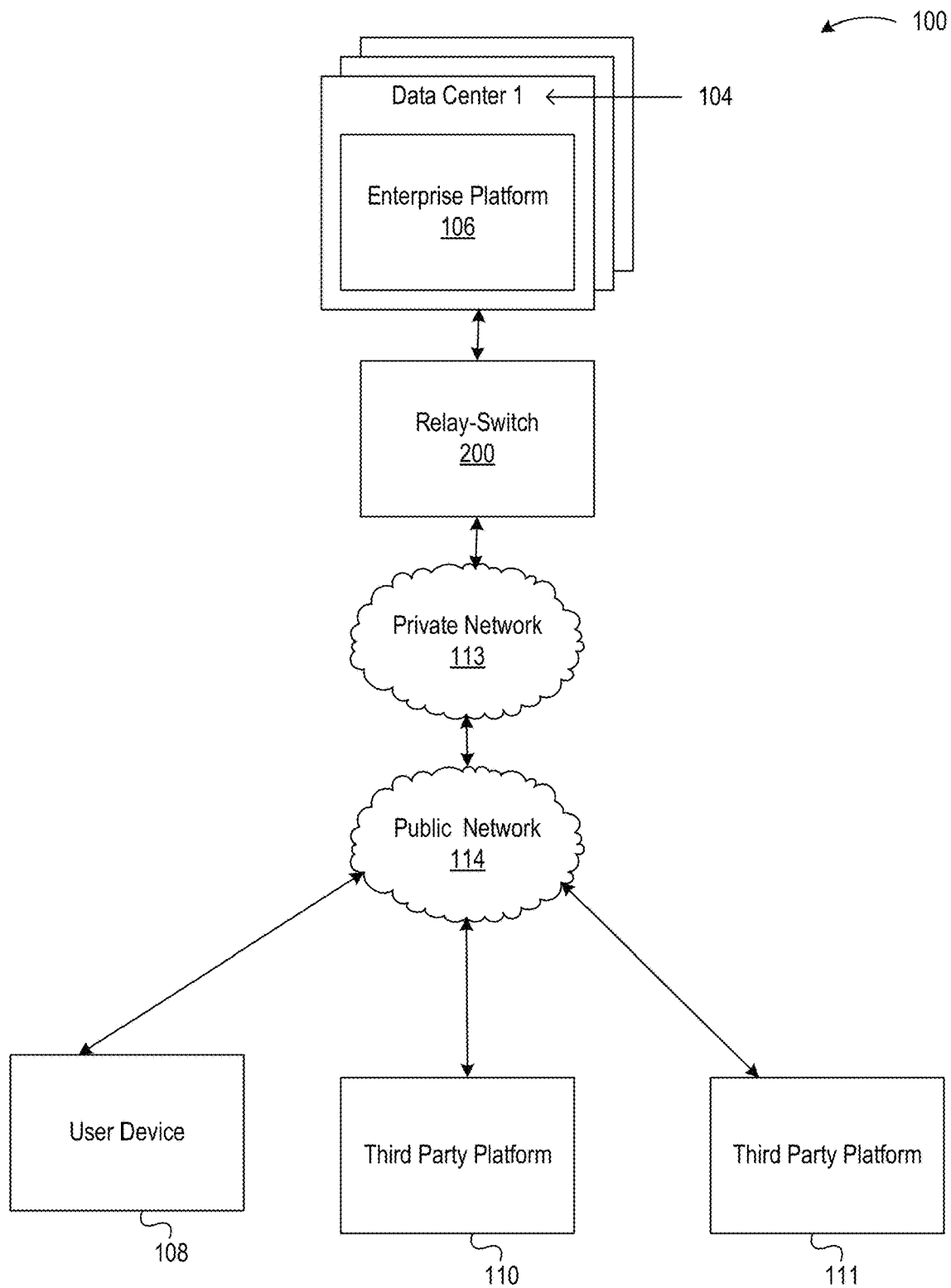
FIGS. 1A and 1B illustrate a computing environment for preventing cyber threats when connected to external untrusted networks in accordance with one or more aspects described herein.
Figure 1B:
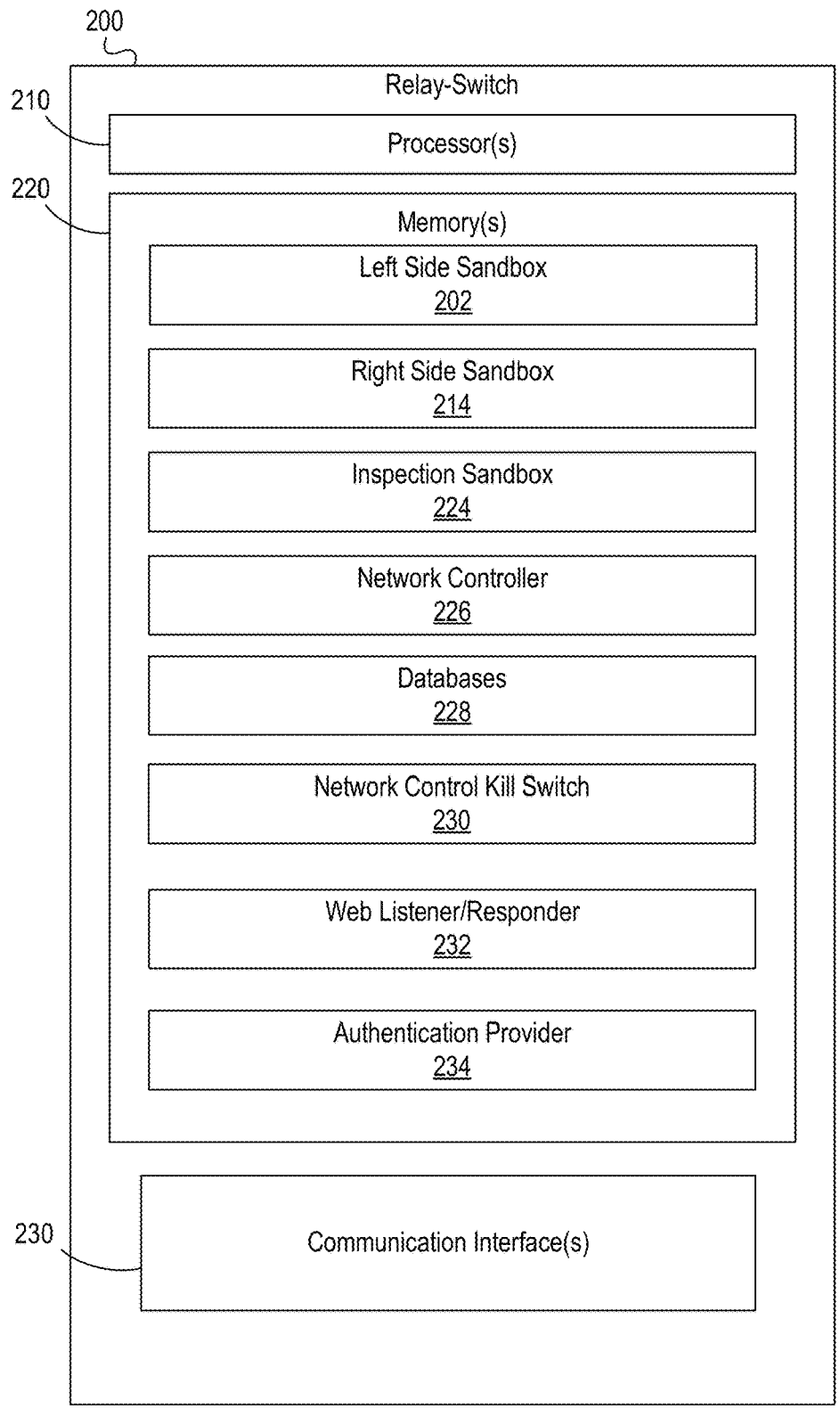

FIGS. 1A-1B depict an illustrative computing environment 100 for implementing and using a relay-switch 200 for safe network connections in accordance with various embodiments of the disclosure. Computing environment 100 may include one or more data centers and one or more computing devices, including computing devices located at or within such data centers and computing devices not located at or within such data centers. For example, computing environment 100 may include a first data center 104. Data center 104 may include an enterprise platform 106. Computing environment 100 also may include a user device 108, and numerous external third party platforms or networks such as third party platform 110-111.

Data center 104 may be a distinct and physically separate data center operated by and/or otherwise associated with an organization, such as a financial institution. In addition, data center 104 may house a plurality of server computers and various other computers, network components, and devices along with numerous enterprise platforms.

In an aspect of the disclosure, a relay-switch 200 may be configured to provide one or more portal interfaces to one or more devices and/or may be configured to authenticate and/or monitor one or more devices.

In some arrangements, the data center and associated enterprise platforms may be linked over a private network 113 associated with the enterprise organization. The computing environment 100 may also include public network 114 which allows communication between user device 108, and numerous external third party platforms or networks such as third party platform 110-111. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The enterprise platform 106 may comprise one or more computing devices and/or other computer components (e.g., processors, memories, communication interfaces). In addition, the enterprise platform 106 may be configured to host, execute, and/or otherwise provide one or more enterprise applications. For example, the enterprise platform 106 may be configured to host, execute, and/or otherwise provide one or more transaction processing programs, such as an online banking application, loan application processing programs, and/or other programs associated with an enterprise organization, such as a financial institution. In some instances, the enterprise platform 106 may be configured to provide various enterprise and/or back-office computing functions for an enterprise organization, such as a financial institution. For example, the enterprise platform 106 may comprise various servers and/or databases that store and/or otherwise maintain account information, such as financial account information including account balances, transaction history, account owner information, and/or other information. In addition, the enterprise platform 106 may process and/or otherwise execute transactions on specific accounts based on commands and/or other information received from other computer systems comprising the computing environment 100.

The computing environment 100 may comprise one or more enterprise platforms. The one or more enterprise platforms may comprise applications, servers, and/or databases (hereinafter referred to as assets) that facilitate operations of one or more functionalities and/or services provided by the one or more enterprise platforms. For example, if the enterprise organization is a financial institution, the enterprise platform 106 may comprise assets that facilitate an online banking system associated with the financial institution, and/or assets that facilitate an online money transfer system associated with the financial institution, and the like.

In one or more arrangements, a user device 108 may be any type of computing device capable of receiving a user interface, receiving input via the user interface, and communicating the received input to one or more other computing devices. For example, a user device may, in some instances, be and/or include server computers, desktop computers, laptop computers, tablet computers, smart phones, or the like that may include one or more processors, memories, communication interfaces, storage devices, and/or other components. As noted above, and as illustrated in detail below, a user device may, in some instances, be one or more special-purpose computing devices configured to perform specific functions.

In an embodiment, user device 108 may be configured to provide users with transactional information and may also be configured to provide a mobile banking portal associated with the financial institution to various customers of the financial institution and/or their associated mobile computing devices. Such portals may, for instance, provide customers of the financial institution with access to financial account information (e.g., account balance information, purchase transactions, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Referring to FIG. 1B, relay switch 200 may include one or more processors 210, memory 220, and communication interface(s) 230. A data bus may interconnect processor(s) 210, memory 220, and communication interface(s) 230. Communication interface 230 may be a network interface configured to support communication between enterprise platform 106 and one or more networks (e.g., private network 113, public network 114, or the like). Memory 220 may include one or more program modules having instructions that when executed by processor(s) 210 cause relay-switch 200 to perform one or more functions described herein and/or one or more databases that may store and/or otherwise maintain information which may be used by such program modules and/or processor(s) 210. In some instances, the one or more program modules and/or databases may be stored by and/or maintained in different memory units of relay-switch 200 and/or by different computing devices that may form and/or otherwise make up relay-switch 200.

For example, memory 220 may have, store, and/or include a left side sandbox 202. In an embodiment, left side sandbox 202 may be generated to receive and process communications received from a trusted internal service located inside an enterprise organization. For example, left side sandbox 202 may be created in relay-switch 200 to handle requests from enterprise platform 106. These requests may include connections to untrusted external networks or third party platforms to exchange data. In an embodiment, left side sandbox 202 may always handle communications to and from internal services of the trusted organization involving communications to untrusted external networks.

Memory 220 may have, store, and/or include a right side sandbox 214. In an embodiment, right side sandbox 214 may be generated to connect and communicate with untrusted external networks or third party platforms to exchange data. In an embodiment, right side sandbox 214 may always handle communications to and from untrusted external networks involving communications to trusted internal services of the enterprise organization.

Memory 220 may further have, store and/or include an inspection sandbox 224. In an embodiment, inspection sandbox 224 may be generated to inspect any receive communications from untrusted external networks or third party platforms. In an embodiment, inspection sandbox 224 may scan communications for malware and other cyber threats. Inspection sandbox 224 may remove or cure any discovered malware or threat.

Memory 220 may further have, store and/or include a network controller 226. In an aspect of the disclosure, network controller 226 may determine in which sandbox any data or information lives or how that data may be accessed. In an embodiment, network controller 226 may ensure that left side sandbox 202 and right side sandbox 214 are never simultaneously operating so that connection or access to both simultaneously is not possible. For example, network controller 226 may enable/disable both left side sandbox 202 and right side sandbox 214 so only one exists at a given time. In an embodiment, network controller 226 may ensure that the left side sandbox 202 and the right side sandbox 214 are up and down at the correct time to receive, process, or transmit data.

Memory 220 may further have, store and/or include numerous storage modules and/or databases 228. The databases 228 may be used to store requests, session information, responses, exploded recordings and other data in accordance with aspects of the disclosure.

Memory 220 may further have, store and/or include a network control kill switch 230. Network control kill switch 230 may be used if a bad actor is detected and/or discovered malware or cyber threat cannot be cured or isolated. In an embodiment, network kill switch 230 may simultaneously eliminate both the left side sandbox 202 and the right side sandbox 214.

Memory 220 may further have, store and/or include a web listener/responder 232. Web listener/responder 232 may be listening or responding to various requests or responses from services. Web listener/responder 232 may trigger relay switch 200 to initiate flow control of data.

Memory 220 may further have, store and/or include an authentication provider 234. In an embodiment, authentication provider 234 may verify any received requests before initiating control flow of data by relay switch 200.

In an aspect of the disclosure, the relay switch 200 provides that the left side sandbox 202 and the right side sandbox 214 are not connected at the same time. The left side sandbox 202 and right side sandbox 214 do not directly communicate with each other.

In another aspect of the disclosure, the relay switch 200 may isolate any potential bad actor to only one side of the network namely the right side sandbox 214 and/or potentially the inspection sandbox 224.

In some instances, relay switch 200 may include three sandboxes. The first sandbox or the left side sandbox 202 may act as the receiver for the trusted side. In an embodiment, left side sandbox 202 may receive and store the request. A network controller 226 may drop the left side connections and generate a second sandbox or right side sandbox 214 to communicate with public or untrusted third party platforms. The network controller 226 may copy and store a copy of the request in a place that can be accessed by right side sandbox 214. The network controller 226 may establish new communications connections between the right side sandbox 214 and external third party platforms. The right side sandbox 214 may read a copy of the request and generate a new request that is transmitted to the external third party platforms. In an embodiment, right side sandbox 214 may wait for a response from the external third party platform. When received the right side sandbox 214 may store the response. In an aspect of the disclosure, upon receiving the response, network controller 226 may eliminate the right side sandbox 214 to ensure that if any bad actor somehow gained access into the relay-switch 200 system they are removed and cannot gain access to the trusted side of the enterprise organization. In an embodiment, network controller 226 may create a third sandbox or an inspection sandbox 224. The inspection sandbox 224 may read the right side response and inspect the response for malware or cyber threats. In an embodiment, the inspection of the response may be conducted without any network attached to the relay-switch 200 to prevent possibility of a threat reaching the trusted enterprise organization. If malware or cyber threats are discovered, inspection sandbox 224 removes or cures the threat, and creates a new copy of the response. The new copy of the response may ensure that no malware, virus, or undetected threat is forwarded to the trusted enterprise organization.

In a further aspect of the disclosure, network controller 226 may generate or restore left side sandbox 202. A web responder 232 of the left side sandbox 202 may read the content of the response and transmit it to the trusted enterprise organization.

Figure 2:
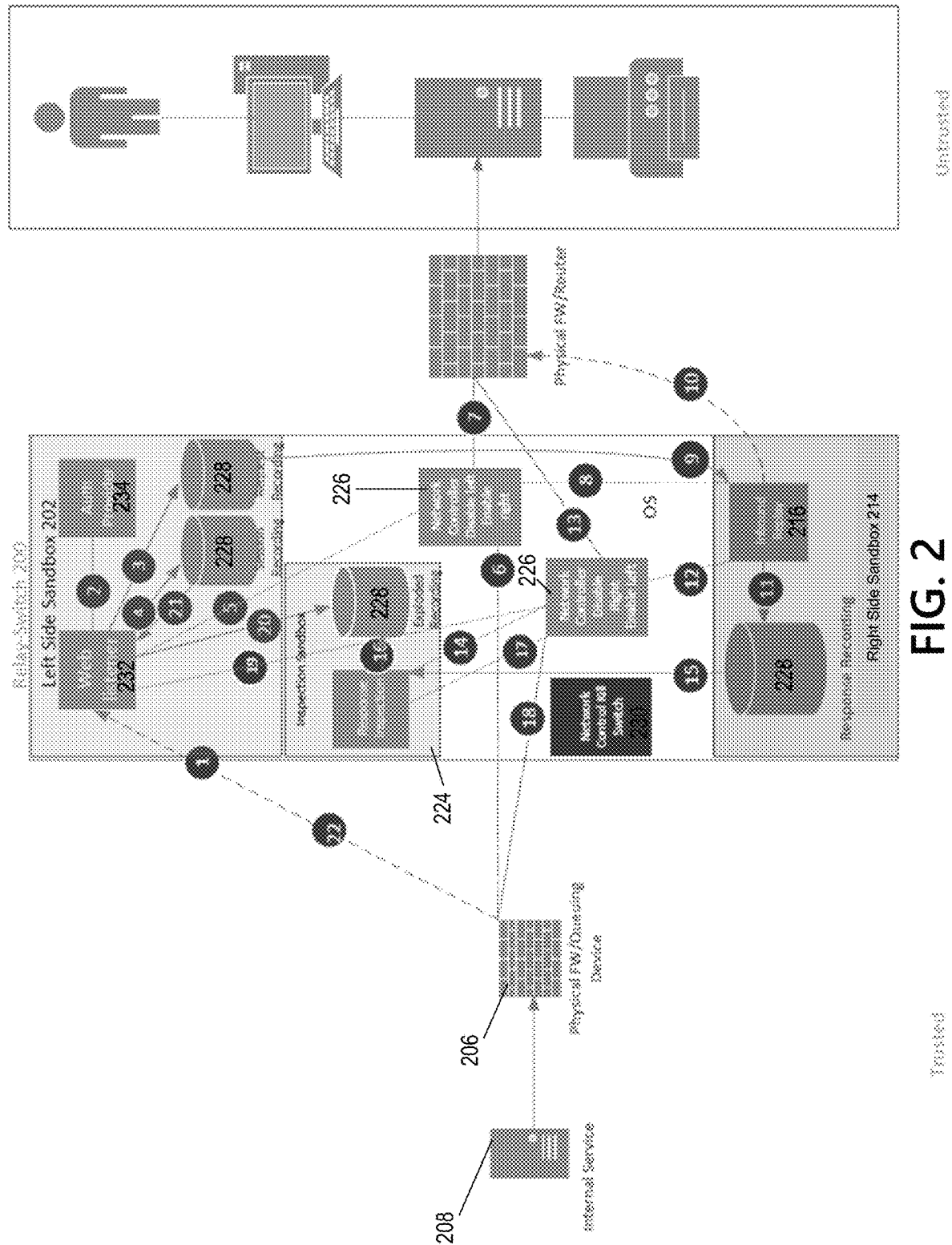
FIG. 2 illustrates a flow diagram preventing cyber threats when requesting and receiving data from an external untrusted network in accordance with one or more aspects described herein.

FIG. 2 illustrates a flow diagram preventing cyber threats when requesting and receiving data from an external untrusted network in accordance with one or more aspects of the disclosure. In FIG. 2 at step 1, a web listener 232 located in left side sandbox 204 of relay-switch 200 listens for a request. The request may be forwarded by a queuing device 206 that receives the request from an internal service 208. Web listener 232 may have the request verified by an authentication provider 234 in step 2 based on the received information in the request. In step 3, web listener 232 may store the received request in a request recording database 228.

In some arrangements, in step 4, web listener 232 may record session information in a session recording database 228.

In step 5, web listener 232 signals to a network controller 226 to trigger a relay switch. In an embodiment, in step 6 network controller 226 disables internal network ports on the trusted network and in step 7 enables external network ports on the untrusted network. In step 8, network controller 226 creates right side sandbox 214 and copies the request into right side sandbox 214 to a location accessible and capable of receiving a response to the request in right side sandbox 214. In an embodiment, network controller 226 via inbound replay 216 triggers forwarding of the request. In some arrangements, network controller 226 may also create right side sandbox's network after the request has been copied and allows an inbound replay 216 as shown in step 9.

In an embodiment, the inbound replay of step 9 is read and the request is forwarded as a new session. The new session may be short lived and, in some embodiments, the new session may be encrypted. In an aspect of the disclosure, inbound replay options may include use of Linux commands such as curl/wget and/or use of libraries or frameworks such as Puppeteer and Selenium.

In step 10, the new session is forwarded through the untrusted network in order to receive a response to the request. In step 11, the received response may be recorded and stored in a response recording database 228.

Once a response is received or in another embodiment, a timeout has been reached, network controller 226 triggers a relay switch in step 12. In step 13, external network ports are disabled and the right side sandbox 214 is eliminated. In an embodiment, in step 14 an inspection sandbox 224 is created by network controller 226 and a response inspection is triggered.

In step 15, the response recording is read for inspection by inspection sandbox 224. The response may be inspected for malware or other cyber threats. In an aspect of the disclosure, if malware or other cyber threat is detected, it is removed or placed into quarantine should removal or elimination of the cyber threat not be possible during this stage.

The exploded recorded response which has been inspected may be stored in an exploded recording database 228 in step 16.

In step 17, network controller 226 triggers a relay switch. In an aspect of the disclosure, internal network ports on the trusted network are enabled as shown in step 18. In step 19, network controller 226 signals web listener 232 that the exploded response is ready to be read. In step 20, web listener 232 reads the exploded response from exploded recording database 228. In step 21, the session recording may be read by web listener 232. In step 22, the exploded response may be forwarded to the requesting party in a new session. In an embodiment, after the exploded response has been transmitted, the left side sandbox 202 may be eliminated.

In some arrangements, the inspection may be initiated when no networks are connected to relay-switch 200. In other arrangement, devices may be deactivated by temporarily deleting associated device drivers to ensure devices are not connected. In these arrangements, devices may not communicate until device drivers are installed.

In an aspect of the disclosure, relay switch 200 is interrupting data flow at various points in the process. In an embodiment, network controller 226 determines where the data lives and how the data is accessed. Network controller 226 ensures that the data is not accessible to both left side and right side at same time. Network controller 226 may ensure that left side and right side networks are up and down at appropriate times.

In another aspect of the disclosure, a network control kill switch 230 may be implemented to simultaneously eliminate both the left side sandbox and right side sandbox should an event occur which would require immediate reset of the entire system. Network control kill switch 624 may be used if a bad actor is detected or discovered malware cannot be removed and networks are at risk.

In another exemplary embodiment, network controller 230 may disable any network sandbox forwarding or connections. The forward disabling or sandbox disconnection may be implemented in various ways such as through use of Linux commands ifup and ifdown/ip or by turning the physical port up and down. Those skilled in the art will realize that other methods may be used to disconnect the left and right side sandboxes should the inspection discover malware that cannot be eliminated.

In an aspect of the disclosure, sandboxes may utilize Linux namespaces (i.e. pid, net, mnt). In another embodiment, the inspection sandbox may utilize a net namespace that goes nowhere). In a further embodiment, the sandboxes may utilize Intel-VTx, SELinux, and/or Access Controls (fad, chown/shmod, cgroups, etc.).

In another aspect of the disclosure, network controller 226 for flow control may utilize IPC using semaphores or IPC using shared memory.

Figure 3:
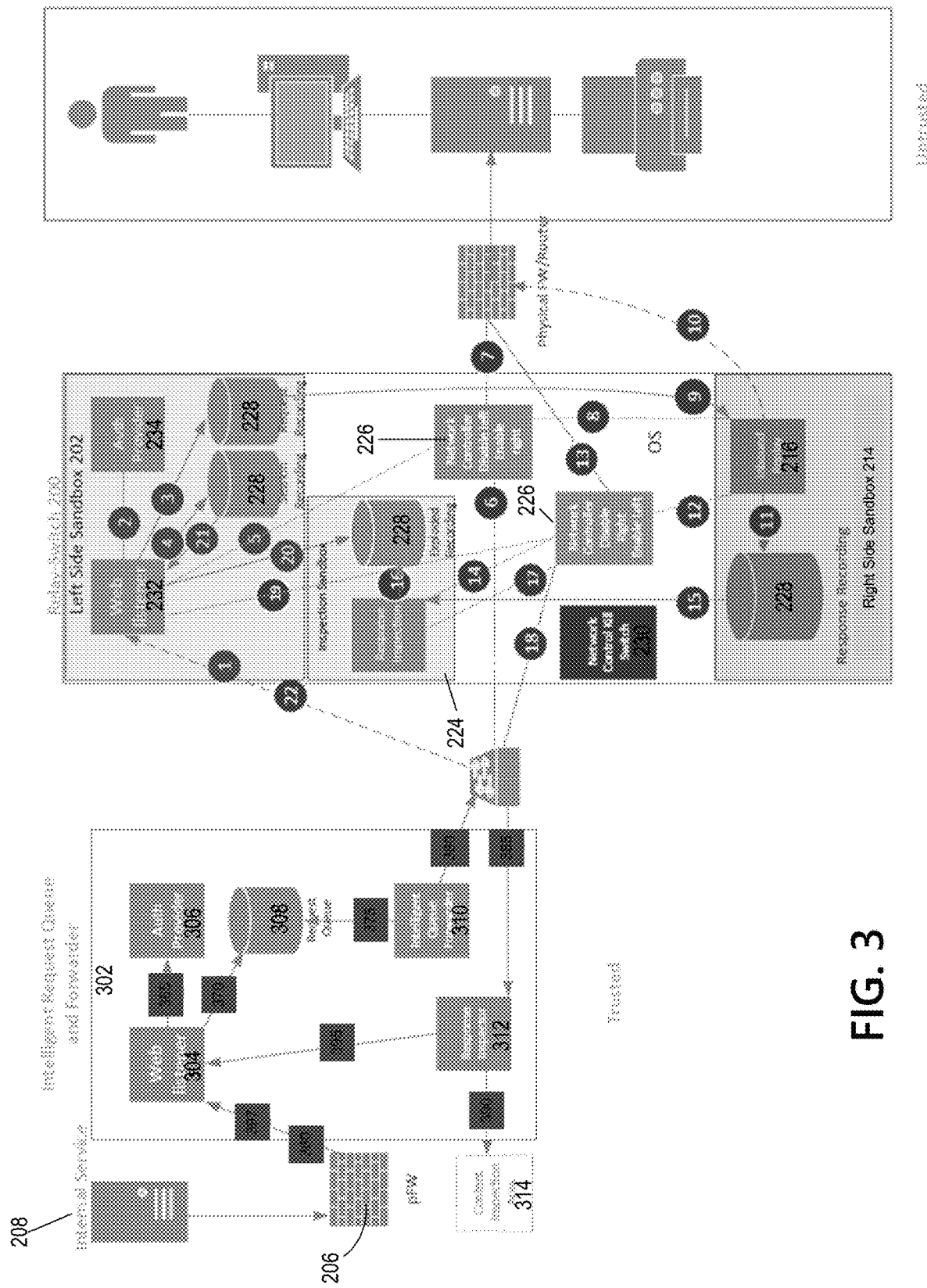
FIG. 3 illustrates an intelligent request queue and forwarder according to one or more aspects described herein.

FIG. 3 illustrates an intelligent request queue and forwarder according to one or more aspects of the disclosure. In FIG. 3, a front-end system is added to the relay-switch 200 in order to handle numerous requests that may be received. Each of these received requests may need to be processed by relay-switch 200.

In an aspect of the disclosure, intelligent request queue and forwarder 302 may determine that the received request can forwarded to an external network without being processed through relay-switch 200.

In an embodiment, relay-switch 200 handles one request at a time and intelligent request queue and forwarder 302 serializes all of the requests to be processed by relay-switch 200.

In an embodiment, intelligent request queue and forwarder 302 is connected to the left side sandbox 202 of relay-switch 200. In step 360, web listener 304 receives a request from an internal service 208 which needs to be processed by relay-switch 200 to connect to and receive a response from an external untrusted third party platform.

In step 365, the received request is authenticated by authentication provider 306. Once authenticated the request is queued and stored for forwarding to relay-switch 200 in step 370. In an aspect of the disclosure, intelligent request queue and forwarder 302 determines the queuing order of the requests and may continuously update the determined order based on newly received requests. The determined queuing order may be based on priority of the received requests and/or other ranking criteria.

In an embodiment, the intelligent queue forwarder 310 detects that relay-switch 200 is switched to left side sandbox 202 and reads one request from queue 308 in step 375.

In step 380, intelligent queue forwarder 310 transmits one request to relay-switch 200 for processing. Relay-switch 200 process the request as discussed above with respect to FIG. 2. In an aspect of the disclosure when a response is returned from relay-switch 200 in step 385, the response is received by response inspector 312 of intelligent request queue and forwarder 302. In an embodiment, response may be received when left side sandbox 202 is reopened and at least one inspection of the response has already occurred in relay-switch 200.

In step 390, response inspector 312 may call external content inspection tools to complete additional inspections on the received response. In an embodiment, the additional inspection of the response may be accomplished in content inspection area 314. In step 395, response inspector 312 transmits the response to web listener 304 for delivery to the requesting internal service in step 397.

Figure 4:
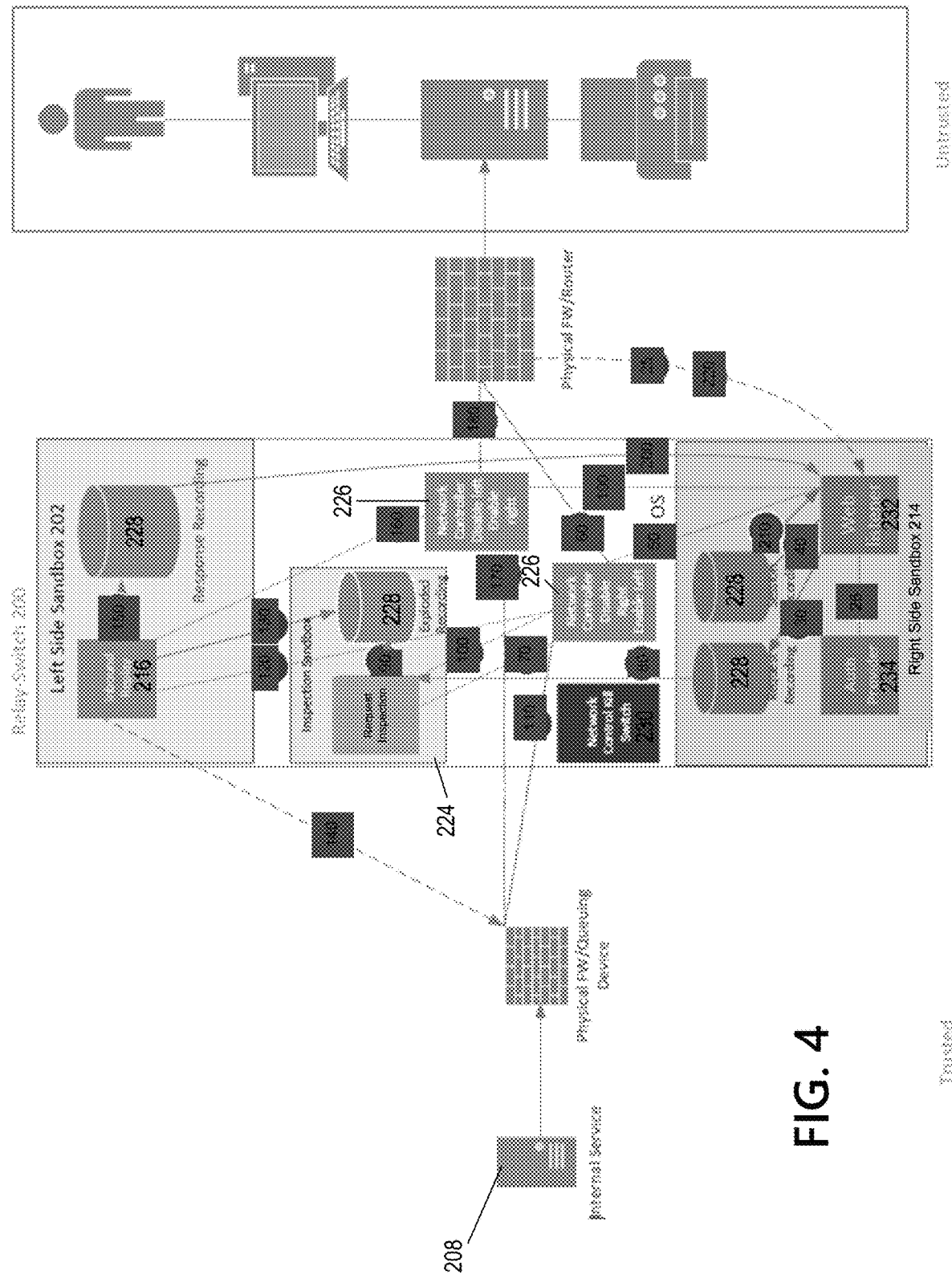
FIG. 4 illustrates a flow diagram preventing cyber threats when receiving requests and providing data to external untrusted networks in accordance with one or more aspects described herein.

FIG. 4 illustrates a flow diagram preventing cyber threats when receiving requests and providing data to external untrusted networks in accordance with one or more aspects of the disclosure. In FIG. 4 at step 25, a web listener 232 located in right side sandbox 214 of relay-switch 200 listens for a request. Web listener 232 may have the request verified by an authentication provider 234 in step 26 based on the received information in the request. In step 30, web listener 232 may store the received request in a request recording database 228.

In some arrangements, in step 40, web listener 232 may record session information in a session recording database 228.

In step 50, web listener 232 signals to a network controller 226 to trigger a relay switch which may close right side sandbox 214. In an embodiment, in step 60 network controller 226 disables external network ports on the untrusted network. In step 70, network controller 226 creates inspection sandbox 224 and a request inspection is triggered.

In step 80, the request recording is read for inspection by inspection sandbox 224. The request may be inspected for malware or other cyber threats. In an aspect of the disclosure, if malware or other cyber threat is detected, it is removed or placed into quarantine should removal or elimination of the cyber threat not be possible during this stage.

The exploded recorded request which has been inspected may be stored in an exploded recording database 228 in step 90.

In step 100, network controller 226 triggers a relay switch. In an embodiment, inspection sandbox 224 may be eliminated. In an aspect of the disclosure, internal network ports on the trusted network are enabled as shown in step 110.

In step 120, left side sandbox 202 may be generated by network controller 226.

In an embodiment, the inbound replay of step 130 is read and the request is forwarded as a new session in step 140. The new session may be short lived and in some embodiments the new session may be encrypted. In an aspect of the disclosure, inbound replay options may include use of Linux commands such as curl/wget and/or use of libraries or frameworks such as Puppeteer and Selenium.

In step 150, the received response may be recorded and stored in a response recording database 228.

Once a response is received or in another embodiment, a timeout has been reached, network controller 226 triggers a relay switch in step 160. In step 170, internal network ports are disabled and the left side sandbox 202 is eliminated. In an embodiment, in step 180 the right side sandbox ports are enabled.

In step 190, network controller 226 triggers web listener 232 to respond. In step 200, web listener 232 reads the response recording and records session data if needed in step 210. In step 220, the replay response recording may be forwarded to the requesting party in a new session. In an embodiment, after the response has been transmitted, the right side sandbox 214 may be eliminated.

In some arrangements, the inspection may be initiated when no networks are connected to relay-switch 200. In other arrangement, devices may be deactivated by temporarily deleting associated device drivers to ensure devices are not connected. In these arrangements, devices may not communicate until device drivers are installed.

In an aspect of the disclosure, relay-switch 200 is interrupting data flow at various points in the process. In an embodiment, network controller 226 determines where the data lives and how the data is accessed. Network controller 226 may ensure that the data is not accessible to both left side and right side at the same time. Network controller 226 may ensure that left side and right side networks are up and down at appropriate times.

In another aspect of the disclosure, a network control kill switch 230 may be implemented to simultaneously eliminate both the left side sandbox and right side sandbox should an event occur which would require immediate reset of the entire system. Network control kill switch 230 may be used if a bad actor is detected or discovered malware cannot be removed and networks are at risk.

Figure 5:
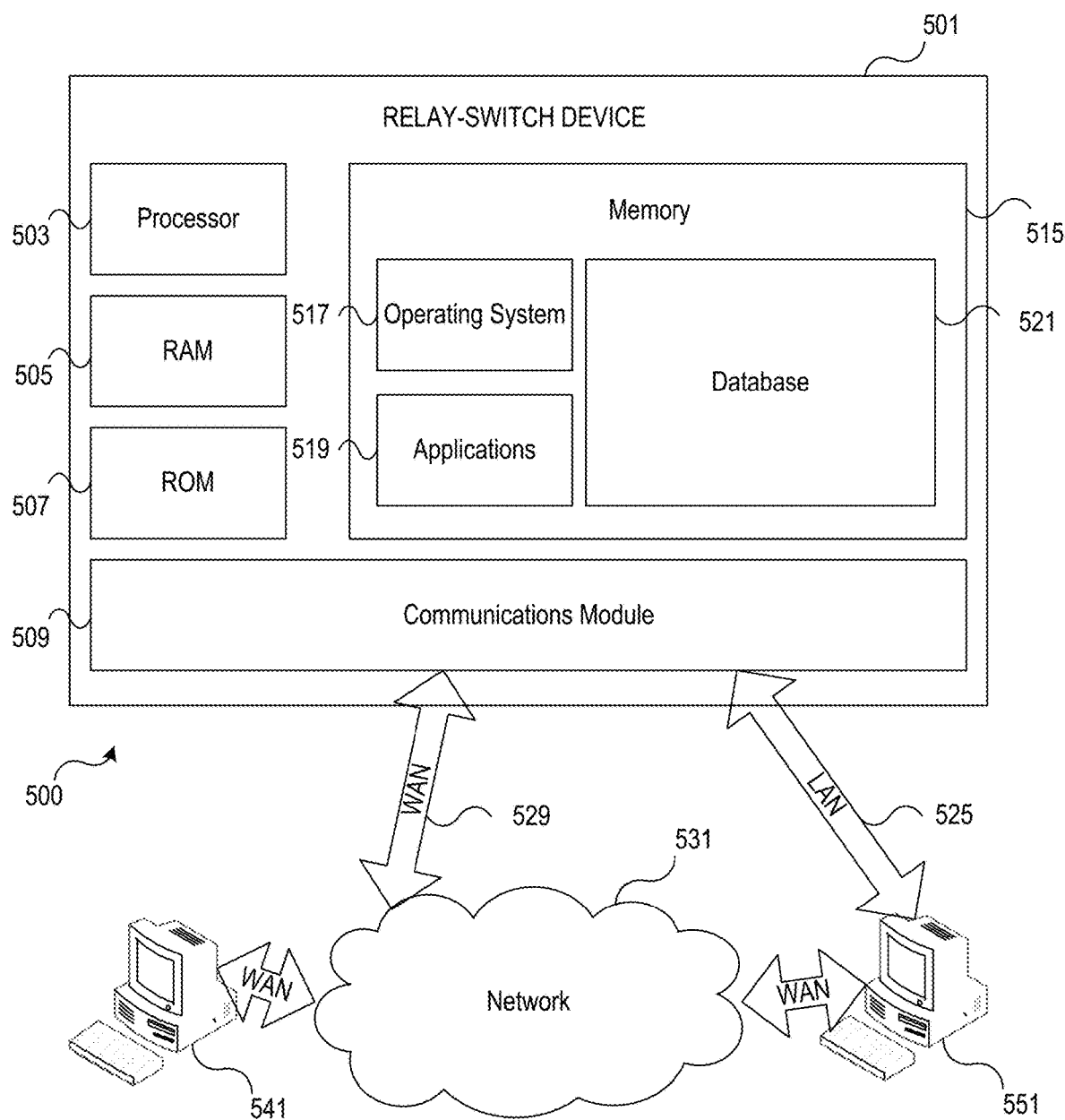
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include relay-switch device 501 having processor 503 for controlling overall operation of relay-switch device 501 and its associated components, including Random Access Memory (RAM) 505, Read-Only Memory (ROM) 507, communications module 509, and memory 515. Relay-switch device 501 may include a variety of computer readable media. Computer readable media may be any available media that may be accessed by relay-switch device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by relay-switch device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on relay-switch device 501. Such a processor may execute computer-executable instructions stored on a computer-readable medium.

Software may be stored within memory 515 and/or storage to provide instructions to processor 503 for enabling relay-switch device 501 to perform various functions as discussed herein. For example, memory 515 may store software used by relay-switch device 501, such as operating system 517, application programs 519, and associated database 521. Also, some or all of the computer executable instructions for relay-switch device 501 may be embodied in hardware or firmware. Although not shown, RAM 505 may include one or more applications representing the application data stored in RAM 505 while relay-switch device 501 is on and corresponding software applications (e.g., software tasks) are running on relay-switch device 501.

Communications module 509 may include a microphone, keypad, touch screen, and/or stylus through which a user of relay-switch device 501 may provide input, and may also include one or more speakers for providing audio output and a video display device for providing textual, audiovisual and/or graphical output. Computing system environment 500 may also include optical scanners (not shown).

Relay-switch device 501 may operate in a networked environment supporting connections to one or more remote computing devices, such as computing devices 541 and 551. Computing devices 541 and 551 may be personal computing devices or servers that include any or all of the elements described above relative to relay-switch device 501.

The network connections depicted in FIG. 5 may include Local Area Network (LAN) 525 and Wide Area Network (WAN) 529, as well as other networks. When used in a LAN networking environment, relay-switch device 501 may be connected to LAN 525 through a network interface or adapter in communications module 509. When used in a WAN networking environment, relay-switch device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
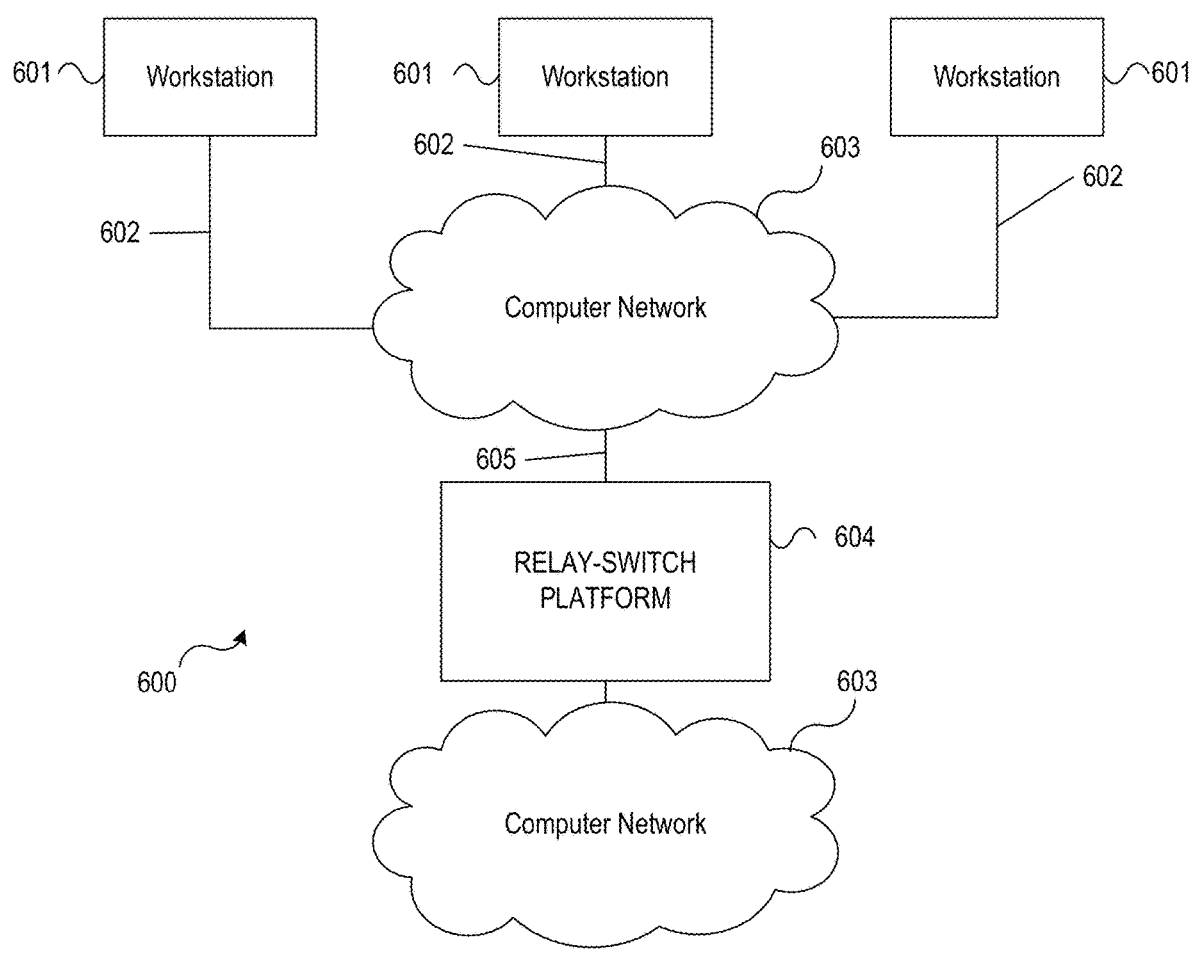
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstation 601 may be local or remote, and may be connected by one of communications links 602 to computer network 603 that is linked via communications link 605 to relay-switch platform 604. In system 600, relay-switch platform 604 may be a server, processor, computer, or data processing device, or combination of the same, configured to perform the functions and/or processes described herein.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and relay-switch platform 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A network connection device comprising:
   at least one processor; and
   memory storing computer-readable instructions that, when executed by the at least one processor, cause the network connection device to:
   receive a request at a first sandbox to connect to an untrusted external platform, the received request from a trusted internal service;
   authenticate the received request;

disable internal network ports of the trusted internal service and enable external network ports connected to the untrusted external platform;
generate a second sandbox;
receive a copy of the received request in the generated second sandbox;
transmit the copy of the received request to the untrusted external platform;
receive a response from the untrusted external platform at the second sandbox;
generate an inspection sandbox to inspect the received response;
inspect the received response for malware;
if malware is not detected, enable internal network ports of the trusted internal service and disable external network ports connected to the untrusted external platform;
receive the response at the first sandbox; and
transmit the response to the trusted internal service.

2. The network connection device of claim 1, wherein the computer-readable instructions, when executed by the at least one processor, cause the network connection device to:
deactivate the first sandbox after the second sandbox receives a copy of the request.

3. The network connection device of claim 1, wherein the computer-readable instructions, when executed by the at least one processor, cause the network connection device to:
deactivate both the first sandbox and the second sandbox prior to inspecting for malware the received response.

4. The network connection device of claim 1, wherein the computer-readable instructions, when executed by the at least one processor, cause the network connection device to:
deactivate the second sandbox prior to inspecting for malware the received response.

5. The network connection device of claim 1, wherein the computer-readable instructions, when executed by the at least one processor, cause the network connection device to:
record session data based on the received request from the trusted internal service.

6. The network connection device of claim 1, wherein the computer-readable instructions, when executed by the at least one processor, cause the network connection device to:
prior to receiving a request at the first sandbox, determine a number of requests to be processed by the network connection device; and
determine queuing order for each request of the number of requests.

7. The network connection device of claim 6, wherein further determining queuing order for each request further includes continuously updating the determined order based on receipt of new requests.

8. The network connection device of claim 6, wherein further determining queuing order for each request further includes determining queuing order based on a determined priority for each received request.

9. The network connection device of claim 1, wherein the computer-readable instructions, when executed by the at least one processor, cause the network connection device to:
if malware is detected, remove or quarantine the received request.

10. The network connection device of claim 9, wherein the computer-readable instructions, when executed by the at least one processor, cause the network connection device to:
if malware is not removable, simultaneously eliminate both the first sandbox and the second sandbox.

11. A method comprising:
receiving a request at a first sandbox to connect to an untrusted external platform, the received request from a trusted internal service;
authenticating the received request;
disabling internal network ports of the trusted internal service and enabling external network ports connected to the untrusted external platform;
generating a second sandbox;
receiving a copy of the received request in the generated second sandbox;
transmitting the copy of the received request to the untrusted external platform;
receiving a response from the untrusted external platform at the second sandbox;
generating an inspection sandbox to inspect the received response;
inspecting the received response for malware;
if malware is not detected, enabling internal network ports of the trusted internal service and disabling external network ports connected to the untrusted external platform;
receiving the response at the first sandbox; and
transmitting the response to the trusted internal service.

12. The method of claim 11, further comprising deactivating the first sandbox after the second sandbox receives a copy of the request.

13. The method of claim 11, further comprising deactivating both the first sandbox and the second sandbox prior to inspecting for malware the received response.

14. The method of claim 11, further comprising deactivating the second sandbox prior to inspecting for malware the received response.

15. The method of claim 11, further comprising:
prior to receiving a request at the first sandbox, determining number of requests to be processed by a network connection device; and
determining queuing order for each request of the number of requests.

16. The method of claim 15 further determining queuing order based on a determined priority for each received request.

17. A non-transitory computer readable medium storing computer executable instructions, that when executed by a processor, cause:
receiving a request at a first sandbox to connect to an untrusted external platform, the received request from a trusted internal service;
authenticating the received request;
disabling internal network ports of the trusted internal service and enable external network ports connected to the untrusted external platform;
generating a second sandbox;
receiving a copy of the received request in the generated second sandbox;
transmitting the copy of the received request to the untrusted external platform;
receiving a response from the untrusted external platform at the second sandbox;
generating an inspection sandbox to inspect the received response;
inspecting the received response for malware;
if malware is not detected, enabling internal network ports of the trusted internal service and disabling external network ports connected to the untrusted external platform;
receiving the response at the first sandbox; and
transmitting the response to the trusted internal service.

18. The non-transitory computer readable medium storing computer executable instructions of claim 17, further including instructions that, when executed by the processor, cause deactivating the first sandbox after the second sandbox receives a copy of the request.

19. The non-transitory computer readable medium storing computer executable instructions of claim 17, further including instructions that, when executed by the processor, cause deactivating both the first sandbox and the second sandbox prior to inspecting for malware the received response.

20. The non-transitory computer readable medium storing computer executable instructions of claim 17, further including instructions that, when executed by the processor, cause deactivating the second sandbox prior to inspecting for malware the received response.

* * * * *